United States Patent [19]

Heitmann

[11] Patent Number: 4,974,082
[45] Date of Patent: Nov. 27, 1990

[54] DIGITAL PULSE GENERATOR OF PHASE AND FREQUENCY PERIODICALLY CONTROLLED PRECISELY BY EXTERNAL SIGNALS

[75] Inventor: Jürgen Heitmann, Alsbach-Hähnlein, Fed. Rep. of Germany

[73] Assignee: Robert Bosch GmbH, Stuttgart, Fed. Rep. of Germany

[21] Appl. No.: 335,770

[22] Filed: Apr. 10, 1989

Related U.S. Application Data

[62] Division of Ser. No. 178,985, Apr. 7, 1988, Pat. No. 4,864,422, which is a division of Ser. No. 909,636, Sep. 18, 1986, Pat. No. 4,769,720.

[30] Foreign Application Priority Data

| Sep. 21, 1985 | [DE] | Fed. Rep. of Germany | 3533703 |
| Sep. 21, 1985 | [DE] | Fed. Rep. of Germany | 3533704 |
| Sep. 21, 1985 | [DE] | Fed. Rep. of Germany | 3533702 |
| Sep. 21, 1985 | [DE] | Fed. Rep. of Germany | 3533698 |
| Sep. 21, 1985 | [DE] | Fed. Rep. of Germany | 3533700 |
| Sep. 21, 1985 | [DE] | Fed. Rep. of Germany | 3533699 |

[51] Int. Cl.⁵ .......................................... H04N 5/04
[52] U.S. Cl. ................................. 358/148; 358/150
[58] Field of Search ............... 358/148, 150, 153, 158, 358/159

[56] References Cited

U.S. PATENT DOCUMENTS 4,652,838   3/1987   Nossen ................................. 380/6

OTHER PUBLICATIONS

"High Speed Programmable Clock Generator", by Koennecker; IBM Technical Disclosure Bulletin; vol. 27, No. 4B, Sep. '84, pp. 2509-2510.

Primary Examiner—John W. Shepperd
Assistant Examiner—Michael D. Parker
Attorney, Agent, or Firm—Frishauf, Holtz, Goodman & Woodward

[57] ABSTRACT

In a video signal processor incorporating a reference clock pulse generator of highly precise frequency, two pulse generators, one preceding the drop-out corrector circuit which includes a picture memory and another following the drop-out corrector, are controlled in phase and frequency periodically in response to a horizontal synchronizing pulse. An addition circuit (101) the output of which is intermediately stored in a 20 place register (105) has a data input (104) to which bits of higher binary significance, for phase control, are supplied in response to the synchronizing pulse and thereafter bits of lower binary digit significance are supplied by a velocity error detection circuit for frequency control during the remainder of a television line interval. The output of the 20 place register is fed back to another input of the addition circuit, to produce a sawtooth wave resulting from the overflow of the addition circuit, which is a submultiple of the reference clock pulse generator frequency. A PROM, responsive to the 10 most significant output bits of the addition circuit, and subsequent processing circuits (114, 118, 115) convert the sawtooth wave to an analog sinusoidal wave which is then frequency multiplied to a frequency approximating the frequency of the reference clock pulse generator.

12 Claims, 10 Drawing Sheets

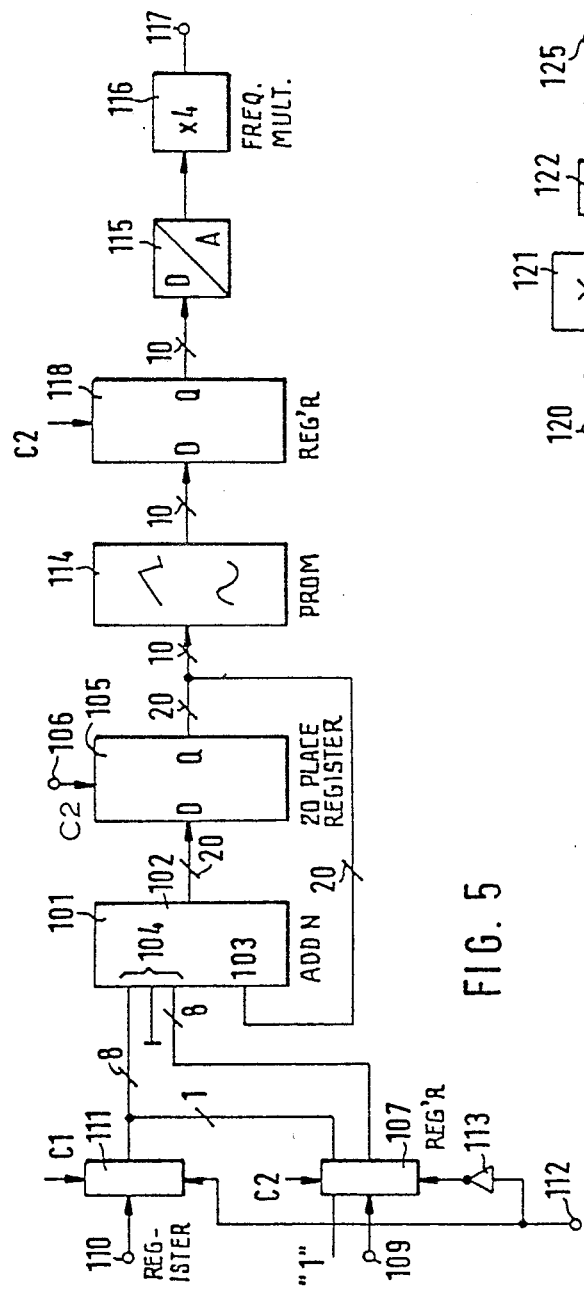
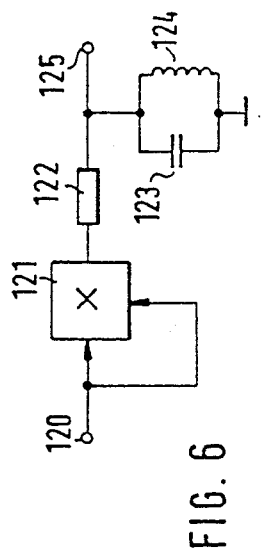
FIG. 5
FIG. 6

DIGITAL PULSE GENERATOR OF PHASE AND FREQUENCY PERIODICALLY CONTROLLED PRECISELY BY EXTERNAL SIGNALS

This is a division of application Ser. No. 07/178,985 filed Apr. 7, 1988, which was a division of application Ser. No. 06/909,636 filed Sept. 18, 1986, now issued as U.S. Pat. No. 4,769,720.

This invention concerns the processing of composite color television signals recovered from magnetic tape or similar information carriers, particularly of the kind in which the recovered signals are converted into digital form and stored in a first intermediate memory utilizing a first clock or rhythm signal from which it is read out with a second clock signal and containing a circuit for compensation of signal dropouts and also a second intermediate memory at the output of the dropout compensation circuit in which the digital signals are written in with the second clock signal and from which they are read out with a third clock signal. The video processing apparatus and method of the invention has involved the provision of clock pulse generator and clock pulse control circuits of higher precision than heretofore available, which are likely to be useful in apparatus other than video processors.

BACKGROUND AND PRIOR ART

In the reproduction of video signals, particularly color television signals, from a record carrier, various errors appear in the signals which need to be compensated to a considerable extent for obtaining the best possible picture reproduction. Most important are time and tape speed errors and also signal dropouts resulting from localized defects of the tape or other record carrier.

It is known to store picture signals in a picture memory which are obtained segment by segment (each segment being an oblique track on a tape) in order to be able to make a "stop frame" still picture reproduction.

Various arrangements have become known, furthermore, for dealing with the types of errors above noted, operating either on an analog or a digital base.

One known system for compensation of time errors in color television signals obtained from a tape record is described in my U.S. Pat. No. 4,376,291. In that system, the color television signals are converted into digital signals and then stored in digital form. First clock signals (C1) are generated the phasing of which is dependent upon the horizontal synchronization signals contained in the color television signal picked up from the tape and the frequency of which is controlled by a first control voltage. The first clock signals (C1) are used for analog-to-digital conversion and for writing the digital signals in a first intermediate memory. A second clock signal (C2), the frequency of which is an integral multiple of a horizontal scanning rate reference signal is used for reading the digital signals out of the first intermediate memory. The deviation of a line period of the digital signals read out of the first intermediate memory from the line period of the reference signal is measured for producing a first control voltage. The horizontal scanning frequency pulses of the reference signal are compared with the corresponding pulses of the signals read out of the first intermediate memory with reference to relative phase and, in a manner dependent upon the phase difference thus found, the writing and reading of digital signals respectively in and out of a memory is so controlled that the time between writing in and reading out corresponds to the phase difference. The signals read out of the memory are later written into a second intermediate memory, from which they are read out by means of third clock signals (C3) which are obtained by controllable phase shifting of the second clock signals. A phase comparison is produced between the color synchronizing signal of the signals read out of the second intermediate memory and a reference color synchronizing signal and the result of this comparison for each line is stored for obtaining a second control signal which is utilized for phase shift of the second clock signal.

A digital picture memory for producing stop frame still pictures or speeded up or slow-motion pictures of the recorded scenes can be connected to follow the equipment utilized in the above-described method.

The compensation of the above-described errors in the known method above described leaves considerable room for improvement. It is an object of the present invention to improve such compensation in a manner as effective as possible at reasonable costs.

Looking more closely at the problem of tape speed errors, particularly fluctuations in speed resulting from various mechanical tolerances in the manufacture of the recording and reproduction machinery handling the tape resulting in what is known as "time base errors", for want of more suitable time marks in the video signal it has been common to correct time base errors only at the end or at the beginning of each line, for example by a phase comparison of the horizontal synchronization pulses of the reproduced signal with reference pulses of the horizontal scanning frequency. In known methods of making this correction the video signals are subjected to a delay which is controlled in a manner tending to correct the timing errors.

In other known systems the video signals are written into a memory with clock pulses subject to timing errors which are derived from the recorded signals and then read out with clock pulses that are free of timing errors. Even with these timing error compensators the timing errors can be measured merely at the end or at the beginning of the lines. Some methods have become known also for compensating the change of timing errors within a line, these changes being referred to as speed or velocity errors. In these methods the delay of the video signals serving for compensation of the timing errors is gradually changed during the running of a line in the sense of the timing error to be expected at the beginning of the next line. For this purpose the known methods compare the timing errors in successive horizontal blanking intervals with each other.

The further processing of the velocity errors determined by this comparison is based on the particular kind of recording method used. In tape machines operating with transverse recording tracks that run almost perpendicular to the tape edges and using four magnetic heads which record successive tracks in turn, and also in the case of the so-called oblique track method producing longer segments as tracks, velocity error compensators are used in which error signals are obtained over a number of head wheel revolutions relating to the velocity errors of lines and for each of the magnetic heads which always have the same position on the tape relative to the tape edge. It has become known mainly in connection with other oblique track recording methods to measure the velocity error every time for a line and to delay the video signals by one line, so that the error signal can be used for the very same line.

Both of the above-described methods of dealing with velocity errors have disadvantages, particularly in connection with machines that operate on the oblique track segment recording method. It is accordingly another object of the present invention to improve particularly the compensation of velocity errors, namely the compensation of the change of timing errors within each line.

It is a further object of the invention to provide a similar velocity error compensation for the color carrier synchronizing signal.

In analog-to-digital conversion of video signals, particularly color television signals, it can be advantageous for various reasons to establish a coupling between the clock signal for the conversion and the video signal. Methods have become known in which the video signal is written into a memory after an analog-to digital conversion in which the clocking or sampling for the conversion and writing the digital signals into a memory is subject to the same timing errors as the video signal. For proper operation of such systems it is necessary to have precise phase coupling of the sampling signal with the reproduced video signal, particularly with the digitized video signal as it appears. It is a further object of the invention to improve the precision of this coupling of the clock signals with the video signal as obtained from the tape.

Another problem in color television signal processing lies in the fact that in magnetic tape recording and reproduction systems in which relatively long oblique tracks known as "segments" are recorded on the tape, many such segments or tracks need to be recorded for one picture field and it is necessary to switch from one magnetic head to another many times in a picture field. In known recording devices this switching is performed during the blanking interval, as the result of which the horizontal synchronization pulses are lost during the switch-over. This loss does not interfere with reproduction of the signals on a monitor or radiation of the signals by a broadcasting station, since in known equipment for those purposes new synchronizing signals are supplied to the television signals.

For detecting and compensating timing errors, however, it is necessary to detect the horizontal synchronization pulses, to measure their time deviation from reference pulses and accordingly to correct the time position of the television signals. The same applies for velocity errors which in the past have been compensated for by slightly time-expanding or time-compressing the portions of lines which incorporate the picture content.

In the known recording and reproduction apparatus, however, there is no horizontal synchronization pulse available at the beginning of the first line after the switch-over between magnetic heads. In the known apparatus extrapolation of the values for the other lines is applied to the first line. It is a further object of the present invention to provide for directly determining the timing error for the first line after a switchover from one head to another, as an optional further improvement in the processing of color television signals.

Another improvement that is desirable relates to handling signal dropouts which provide a disturbing effect in the picture as the result of defects in the magnetizable layer of the record tape. It has long been known to determine the occurrence of such dropouts by suitable circuits and to replace the missing signal portion by signal portions from preceding lines. In the case of color television signals it is important in such case to replace the chrominance signal with the correct color carrier phase, particularly in systems like the PAL system in which there is a phase reversal between alternate lines.

It has been found useful in the past to split the color television signals into chrominance and luminance signals before treatment by the compensation circuit and then, upon detection of a signal dropout, to delay the luminance signal by one line and the PAL color signal by two lines.

These known methods of processing were first carried out with analog circuits and later with digital circuits. In the case of digital circuits for error correction of color television signal which also include circuits for compensation of signal dropouts, a quite high quantization precision, requiring the resolution provided by nine-bit samples, for example, is necessary in order to meet all the requirements that are imposed in professional (studio) television standards. This high bit "width" magnifies the expense of the various digital circuits to be used, however. Furthermore a supplemental signal path is necessary in the known arrangement for the color television signals not split up into luminance and chrominance, so that the split and recombined signals may be used only when there is a signal dropout.

It is accordingly another object of the invention to provide also a more economically practicable method of compensating signal dropouts in color television signals reproduced from a magnetic tape or the like.

SUMMARY OF THE INVENTION

Briefly, there is connected to the output of the circuit for compensation of signal dropouts a digital picture memory, at the output of which there is connected a circuit for separate processing of the chrominance and luminance components of the digital signals taken from the memory. A substantial improvement is obtained by further providing that the digital signals are supplied to a circuit for determining velocity errors of which the output is supplied to first and second clock pulse generators for producing the first and third clock signals mentioned above for controlling the frequency of the first and third clock signals.

The improvement in the correction of velocity errors particularly in the first line of the so-called line packet, as well as for other lines is provided by the producing line by line first error signals corresponding to velocity errors and using them for compensation of the velocity errors of the next line in each case. When that next line is the first line of a track second error signals are produced at the beginning of each track and utilized for the first line of the next track or the afternext track (i.e. the next track recorded by the same head). It has been found by more precise investigation that time errors in the reproduction of video signals obtained from segment type oblique track recording have a relatively low frequency component which is spread out over several head wheel revolutions and that nevertheless the relative changes in going from one segment to another remains substantially constant. This improvement is also available in systems that reproduce an entire picture field on a single oblique track, although it is particularly useful for only a segment of a picture field is recorded on a track.

As for the control of the phase of the color carrier, a phase control signal and a frequency control signal are used. The phase relation between the color synchronizing signals of the composite video signal and a reference signal is measured and the difference between such measurements for successive lines is produced, on the basis of which the phase control signal is subtracted from the differences or from the measured values and the difference values obtained are submitted to a comparison with reference values to produce a resultant signal that is added to the frequency control signal to produce the frequency control signal for the next following line. This method has the advantage that precise measurement of the velocity errors is possible on a digital basis when the sampling of the video signals is done with a clock or sampling signal coupled to the video signals coming from the tape.

Such a coupling is obtained according to the invention by the use of a ramp signal during a section of the composite video signal in the region of the horizontal blanking interval which changes from a first value to a second value according to a prescribed function and has a time position determined from a synchronizing pulse. The thus modified video signal and the clock signal are supplied as the sampling pulses to an analog-to-digital converter and the digital value which is produced during sampling of the inserted signal in the neighborhood of a predetermined point of the function is utilized for correction of the phase of the clock or sampling signal. This has the advantage that by simple circuit means and particularly by the use of ordinary components of digital circuitry a precise phase coupling of the sampling signal with the video signal is obtained, particularly of the video signal just as it is changed into digital form.

The direct measurement of the timing error for the first line following a switching over from one magnetic head to another is made possible, according to the invention, by providing, in addition to a first demodulator switchable, by a first head change switch, between two magnetic heads, also a second demodulator having its input switched by a second head changeover switch, alternately with each of the two magnetic heads. The first head changeover switch operates during the synchronization signals of the television signals and the second outside of the time region occupied by the synchronization signals.

The improvement for the compensation of dropout effects provides for splitting the television signals while in digital form into chrominance and luminance signals and likewise recombining them in digital form and utilizing the recombined color television signals in further processing regardless of whether a dropout is detected. More particularly the color television signals are present with a prescribed bit width and the chrominance and luminance signals are subjected to digital delay circuits with a smaller bit width and/or are passed on for further processing undelayed with the original bit width. Preferably, the bit width is reduced by one bit for the signals that pass through the delay circuits and the original bit width is nine bits. A particular kind of low pass digital transversal filter having coefficients further described below is particularly useful, as well as the use of a black limiter in the path of the luminance signals.

The invention is further described by way of illustrative example with reference to the annexed drawings, in which:

FIG. 2 is a block circuit diagram showing in more detail a portion of FIG. 1a;

Figure 1A:
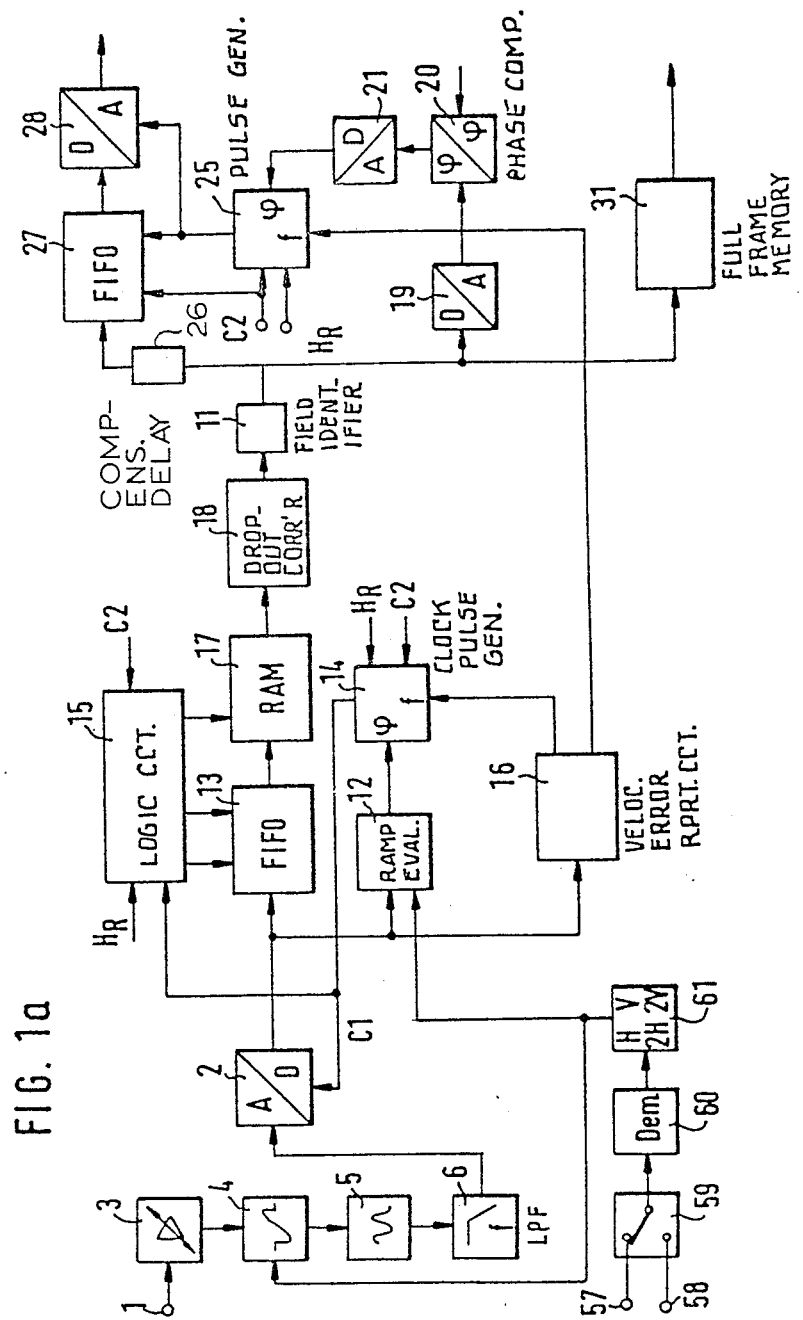
FIG. 1a and FIG. 1d are two parts which must be read together to show the block circuit diagram of an illustrative example of studio signal processor according to the invention.
Figures 3, 4:
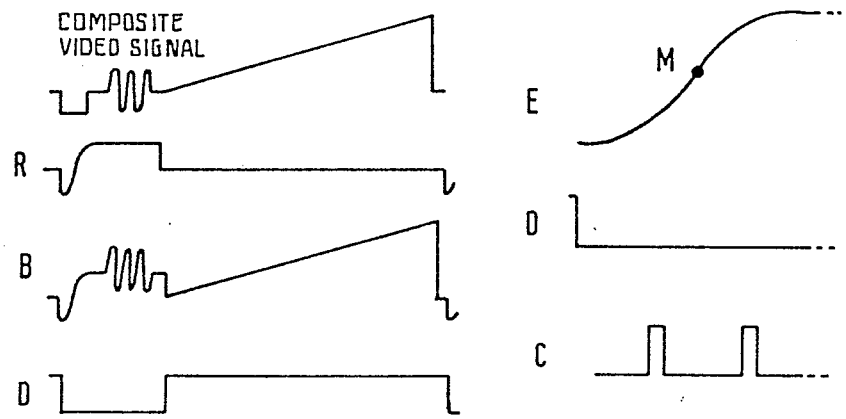
FIG. 3 is a voltage-time diagram of signals occurring in the circuit of FIG. 2.
Figure 7:
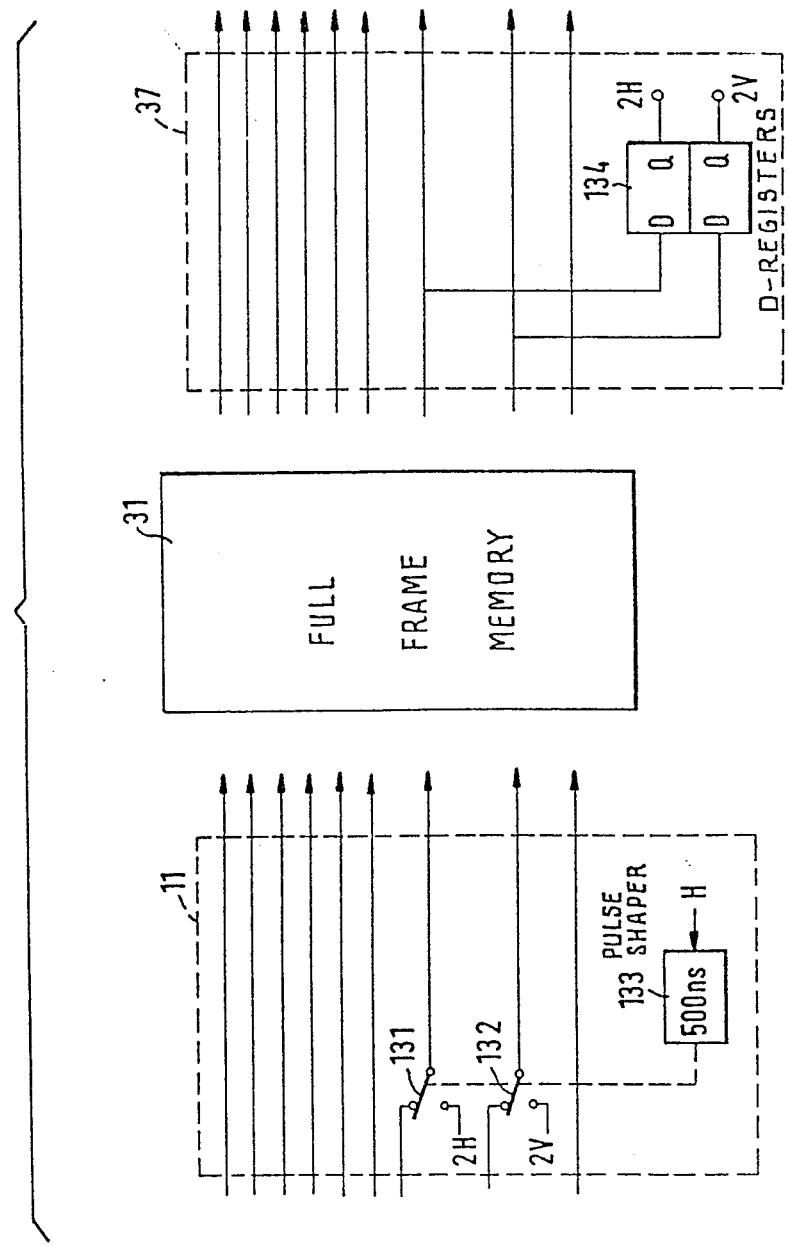
Figure 8:
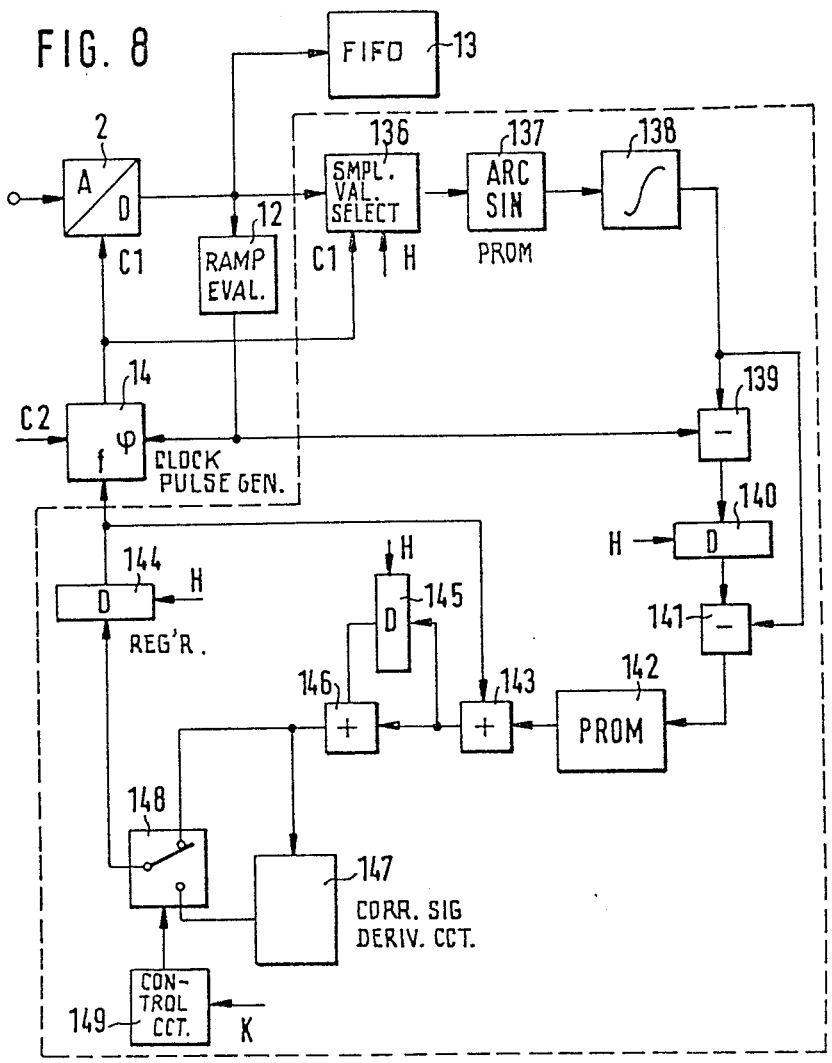
Figure 9:
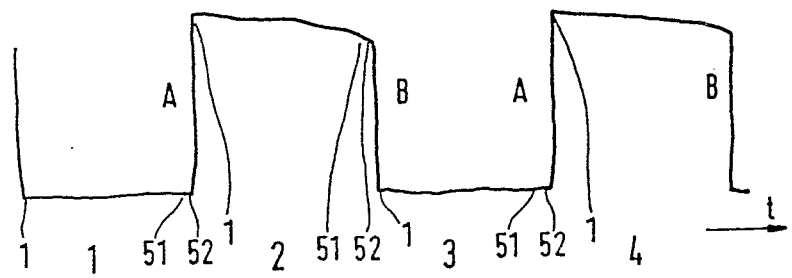
Figure 10:
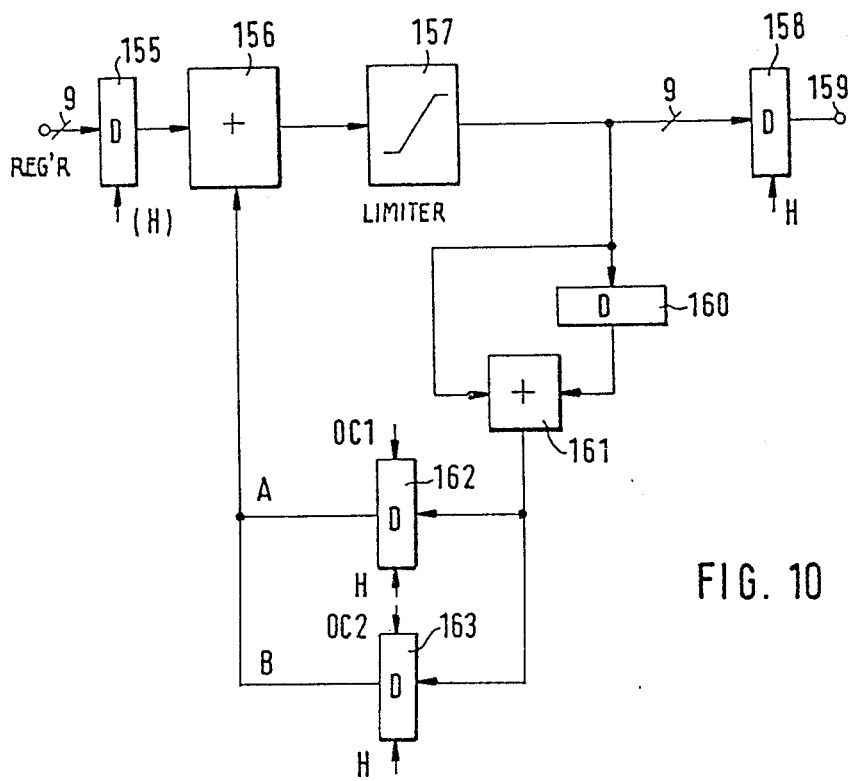
Figure 11:
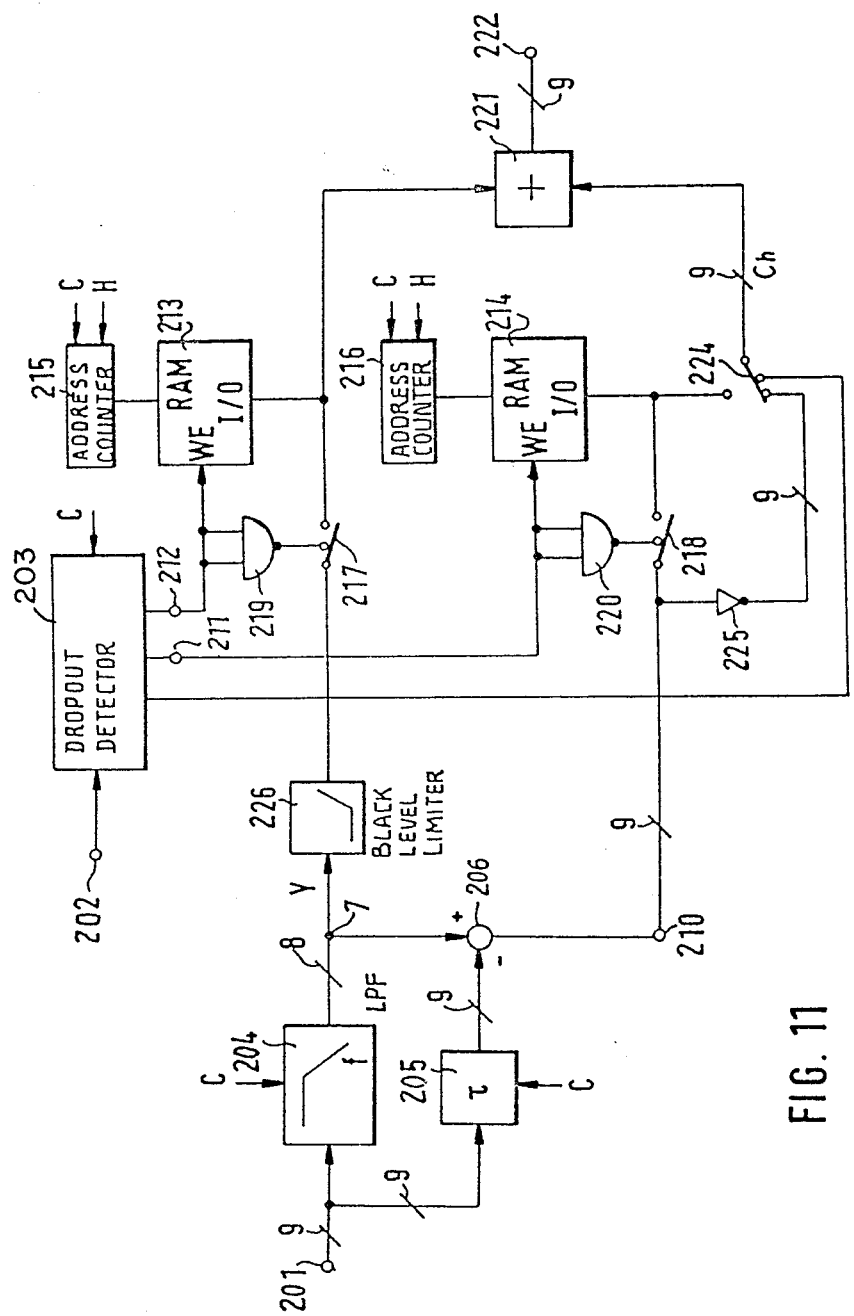
Figure 12:
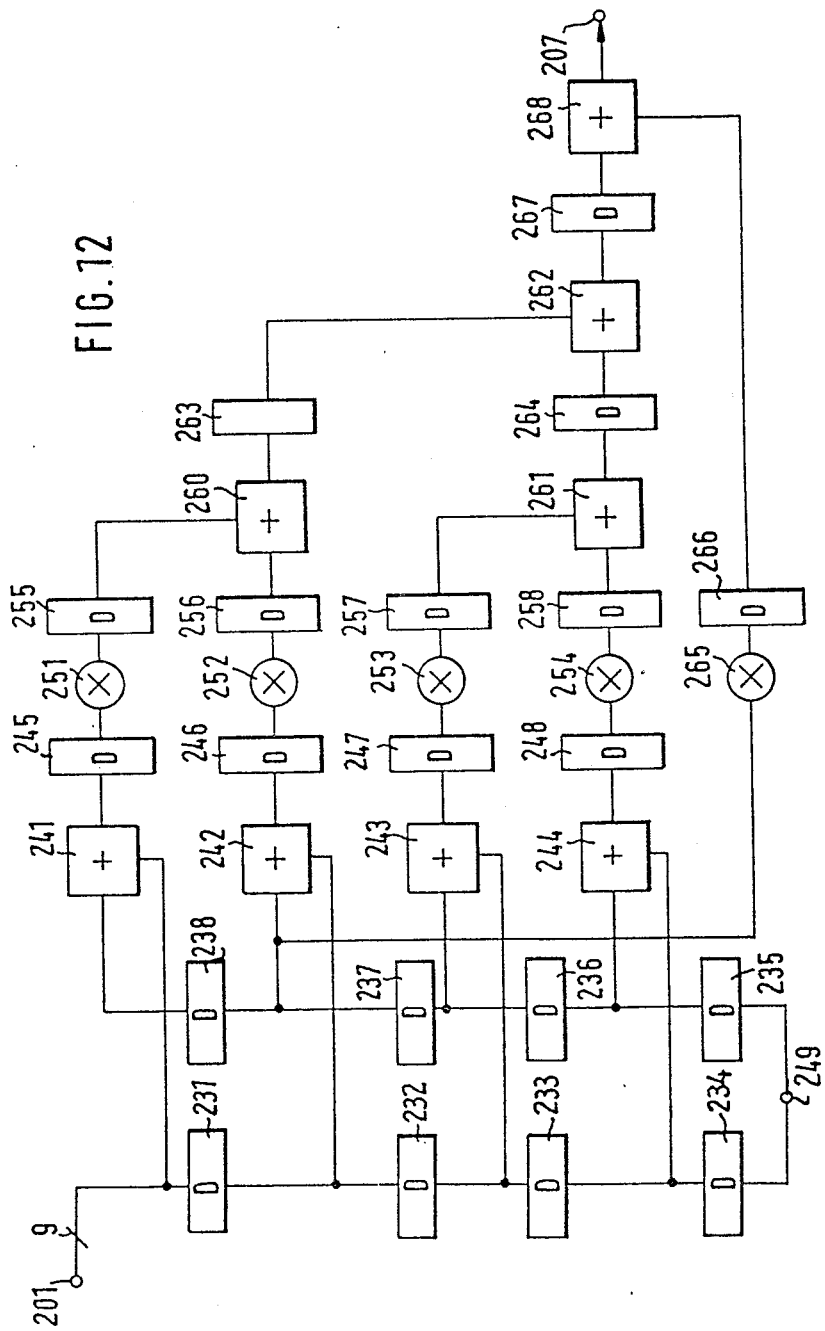
Figure 13:
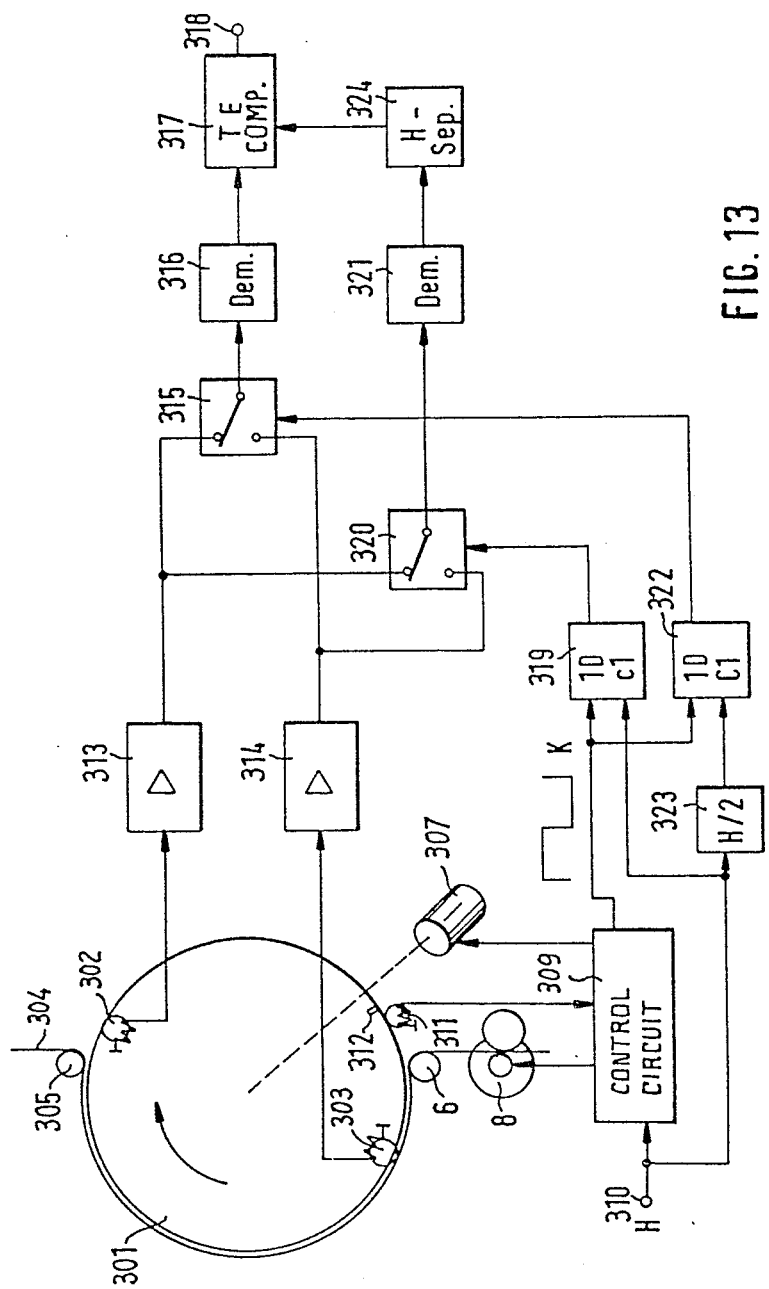

FIG. 4 provides further voltage-time diagrams having a different time scale from those of FIG. 3;

FIG. 5 is a circuit block diagram of a digital clock or timing pulse generator;

FIG. 6 is a detail of the digital pulse generator of FIG. 5;

FIG. 7 is a schematic representation of the insertion and separation of 2H and 2V pulses;

FIG. 8 is a circuit block diagram of a circuit for determining velocity errors;

FIG. 9 is a diagram illustrating by way of example the time course of velocity errors;

FIG. 10 is a circuit block diagram showing in more detail a part of FIG. 8;

FIG. 11 is a block circuit diagram of an improved circuit for compensation of signal dropouts in accordance with the invention;

FIG. 12 is a circuit block diagram in further detail illustrating the digital low pass filter 4 of FIG. 12; and FIG. 13 is a block circuit diagram showing more clearly the use of first and second demodulators referred to in connection with the description of FIG. 1a. The same reference numerals are used in a number of the figures to designate the same components or circuit blocks.

DESCRIPTION OF THE ILLUSTRATED EMBODIMENTS

Figure 1B:
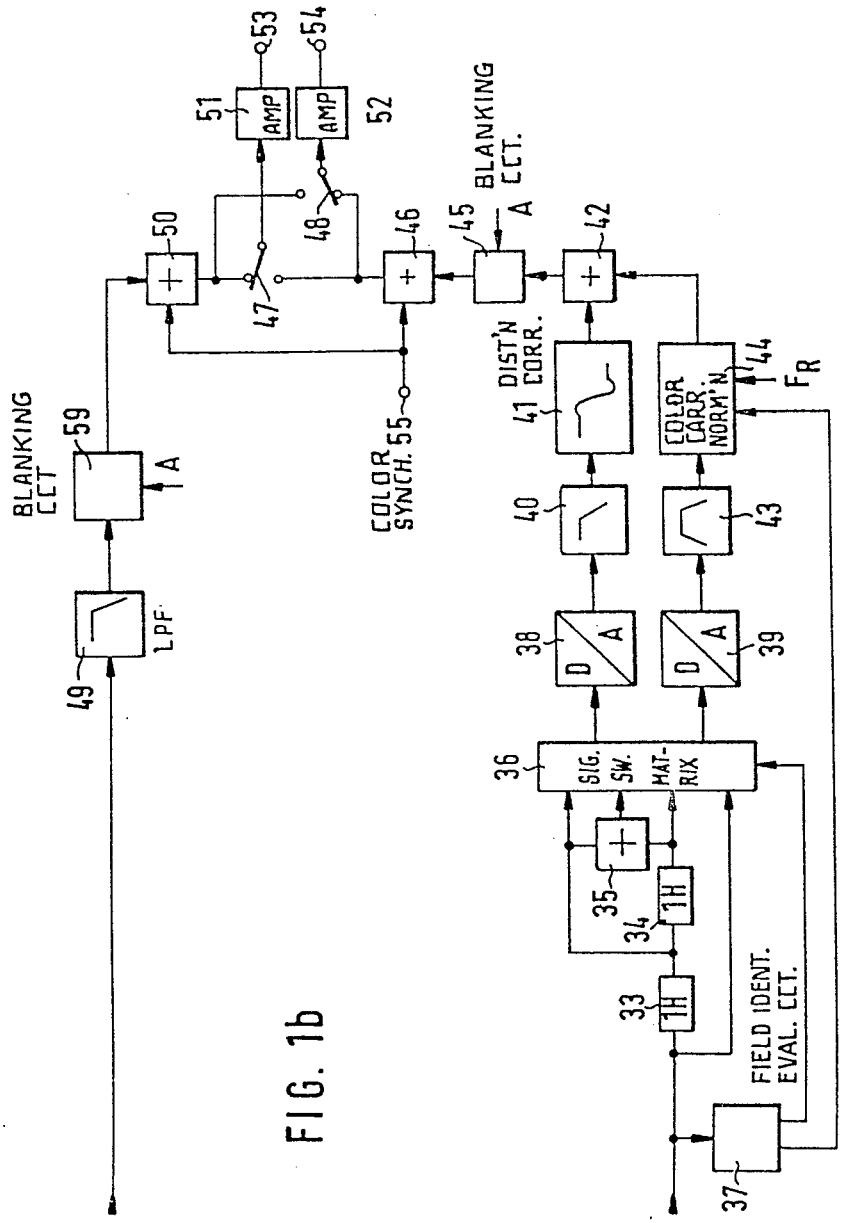

FIG. 1a shows a portion on the input side and FIG. 1b shows the remaining portion on the output side of a video signal processor according to the invention in schematic representation. The composite color television signal designated by one of the internationally recognized acronyms for color picture, blanking and synchronization, namely FBAS, is supplied from the output of the active magnetic heads (in succession) of a magnetic tape video reproducer and recorder. These composite color television signals contain, among unwanted additions or distortions, velocity and time errors as well as signal dropouts. The task of compensating for or correcting these errors is the function of the video signal processor shown in FIGS. 1a and 1b. In addition there is also added supplementarily to the video signal processor a picture store for reproduction at a speed differing from that of recording. This picture memory is particularly important in the case of tape machines in which the signals of each picture field are distributed over a number of tracks.

In the illustrated embodiment the largest portion of signal processing is performed with digital circuits. The composite color television signals at the input 1 are accordingly supplied at an early stage to an analog-to-digital converter 2.

Before the color television signals reach the analog-to-digital converter 2, however, they are first prepared to provide better conditions for later processing steps in the manner that will now be described.

At first the color television signals go to a circuit 3 of known type for adjustment of the amplification and the d-c level set-up. In a circuit 4 more closely described in connection with FIG. 2 there is inserted, in the time region of the horizontal synchronization signal of the color television signal, a predetermined function, referred to hereinafter as a ramp. This function later serves for precisely determining the relative phase relation between the color television signals and the clock or sampling signals used for conversion into digital form.

In a circuit block 5 a phase reversal circuit of the conventional type for compliance with the PAL color television standards in which alternate lines have their color synchronizing signals reversed in phase. In circuit block 5 a phase reversal circuit is used to reverse the phase of the color carrier in alternate lines, so that the line by line phase reversals of television signals of the PAL standard can be eliminated. This phase reversal facilitates later evaluation of the color synchronizing signal for determining velocity errors, but of course the invention is not limited to the use of the PAL color television standard which is used mostly in Europe.

The color television signals are finally passed through a lowpass filter 6 for prevention of alias disturbances.

The quantization in the analog-to-digital converter 2 is performed to a precision of nine bits in order to avoid visible quantization disturbances of the picture. A clock signal C1 is supplied to the analog-to-digital converter of a frequency of about 13.5 MHz, thus about triple the PAL color carrier frequency (since in the illustrated example a color television of the PAL standard is being processed). This clock frequency is coupled or locked to the composite color television signals of the input 1.

The video signal processor illustrated in FIGS. 1a and 1b is usable with magnetic tape apparatus in which every picture field is subdivided in recording on a number of tracks. In a magnetic tape machine with so-called segmented scanning there is switching from one magnetic head to another many times in recording one picture field. This usually occurs during the horizontal blanking interval at which time the horizontal synchronization pulse is lost. The composite television signals supplied at the input 1 therefore have a disturbed or missing synchronization pulse every time before the first line of a so-called line packet. This creates no problem for a later reproduction of the signals on a monitor or for broadcasting since in those cases new synchronizing signals are supplied to the color television signals. For detection of timing errors detection of the horizontal synchronization pulses is necessary, however. In the known recording and reproducing apparatus an extrapolation treatment has haretofore been used based on the timing values obtained for other lines to supply the synchronizing signal for the first line of each line packet.

In the video signal processor according to FIG. 1a and FIG. 1b, there are provided the inputs 57 and 58 from which the carrier frequency output signals of the magnetic heads are supplied directly from the magnetic tape machine after corresponding amplification and frequency response correction. The change-over switch 59 connected to the inputs 57 and 58 is controlled in such a way that this switchover takes place every time within the line that precedes the particular horizontal synchronization pulse at which the signal supplied at the input 1 is changed over from one magnetic head to the other. The output signals of the changeover switch 59 are demodulated at 60 and supplied to a pulse separation circuit 61. This pulse separation circuit is of a known kind and separates the synchronizing signals H, V and 2V from the composite video signal supplied to it. The signal H is utilized in the circuit 4 for forming the ramp signal.

The output signals of the analog-to-digital converter 2 are supplied to the respective inputs of a ramp evaluation circuit 12 and of a FIFO circuit 13. The ramp evaluation circuit 12 is described more particularly in FIG. 2 and produces a digital signal that makes available a measure of the deviation that may exist from a prescribed or desired phase relation between the first clock signal C1 and the horizontal synchronization pulse of the color television signal. This digital deviation signal is supplied to a control input for controlling the phase position of the first clock pulse generator 14. The clock pulse signal C1 which is thus variable in its phase timing is supplied on one hand to the analog-to-digital converter as a sampling rate signal and on the other hand to a logic circuit 15 of the FIFO circuit 13 for timing the writing into the FIFO circuit 13 which is a first intermediate memory. A very precise phase relation between the color television signals and the first clock signal C1 is produced with the help of the circuits 2, 11, 12, and 14 which constitute a regulation loop. A quartz controlled pulse generator not shown in the drawing produces a second clock pulse signal C2 that is supplied to the first clock pulse generator 14. A circuit within the clock pulse generator 14 further described with reference to FIG. 4 makes it possible for the first clock pulse signal C1 to have a constancy of frequency that is just as good as that of the second clock pulse signal C2, although it is variable in phase and frequency relative to the signal C2 when it needs to be changed.

Control of the frequency of the first clock signal C1 is necessary for compensation of velocity errors. For this purpose the circuit 14 is supplied with a corresponding digital signal from a circuit 16 for reporting of velocity errors. The circuit 16 is further explained with reference to FIG. 6.

The clock pulse signal C1 is supplied from the first clock pulse generator 14 through a logic circuit 15 to the FIFO circuit 13 and thereby controls the write-in rhythm for the FIFO circuit 13. In the logic circuit 15 address signals are produced for control of a write-read memory (RAM) 17 in a manner already known in connection with known time error compensators. The RAM 17 has the capacity of about two lines, so that timing errors can be compensated for up to about one line by corresponding addressing. At the output of the RAM 17 the digital signals are then available in which to a first approximation the time and velocity errors are compensated.

The digital signals are then supplied to a circuit for compensation of signal dropouts. Suitable circuits for that purpose are already known and do not need to be further explained in connection with this aspect of the present invention, but as later described in connection with FIGS. 12 and 13, the present invention also encompasses the use of an improved circuit for dealing with signal dropouts in the video signal processor of this invention.

The signal dropout compensation portion of the circuit of FIG. 1a is designated 18 and is followed by a circuit 11 by which there are inserted among the digital signals some signals for designating the switching phase of the color carrier and designating the picture fields as first and second fields of a frame. The recognition of the switching phase of the color carrier relates to the PAL television standard and is necessary for later processing in the illustrated example, since the color synchronization signal reversed by means of the circuit 5 no longer contains this information. In other words the reversals provided by the circuit 5 have undone the reversals in the originally recorded PAL standard color television signal. The identification of the first and second picture fields of each frame is needed in reading out the color television signals from the picture memory in order to obtain correct line interlace.

Since high precision requirements are to be observed for the phase of the chrominance signals in color television systems utilizing quadrature modulation (for example the NTSC standard) in the known time error compensators an additional stage, often referred to as a fine timing error compensator, is added to the first stage. In such systems the time position of the chrominance signals is shifted in such a way that the color synchronizing signals coincide as precisely as possible with a reference color carrier that is supplied in the correction system.

In the video signal processor shown in FIGS. 1a and 1b this problem is solved by the circuit portions described below, in which there is also carried out a further correction for the residual velocity error.

As shown in the Figures, the digital signals are supplied through a digital-to-analog converter 19 to a phase comparison circuit 20, where the phase position of the color synchronizing signal is compared with a reference color carrier. The output voltage of the phase comparison circuit 20 is supplied through an analog-to-digital converter 21 to the input for control of the phase position of a second digital pulse generator 25. The digital signals from the dropout corrector 18 and the line and field identifier 11 pass through a circuit 26 for compensation for the propagation time of the circuits 19, 20 and 21 before going into the FIFO circuit 27 into which they are written with the highly precise timing pulses C2. Read-out from the FIFO circuit 27 is produced with the clock pulses C3 of the digital pulse generator 25 the phase deviations of which from the clock pulses C2 correspond to the time errors still to be corrected.

The digital signals thus read out of the FIFO circuit 27 then proceed into an analog-to-digital converter 28, from the output of which they are supplied to a low-pass filter 49 (FIG. 1b) which serves for suppressing the timing pulse disturbances still present in the signal. The signals now filtered and in analog form, as shown in FIG. 1b, then proceed to a blanking circuit 59 for renewing the blanking interval under control of a blanking signal A supplied to the circuit 59. Then, a color synchronizing and black burst signal supplied at the terminal 55 is inserted in addition circuit 50. The color television signals then proceed over switches 47 and 48 to the output amplifiers 51 and 52. The corrected color television signals are then made available for further use at the outputs 53 and 54 of the output amplifiers 51 and 52.

The output signals of the circuit 18 for compensation of signal dropouts are written into a full-frame memory 31 (FIG. 1a) for reproduction of the color television signals with a rate of movement different from that which was recorded, namely stop frame, slow motion and speeded up motion. For reducing expense the digital signals are written into the full-frame store memory 31 with a bit width of only eight bits. Such full-frame memories are thoroughly described in the technical literature in connection with the above-named reproduction modes, especially for the case of magnetic tape apparatus utilizing oblique segment scanning, so that the memory 31 does not need to be further explained here. The digital color television signals read out of the full-frame memory 31, as shown in FIG. 1b, pass through two one-line delay circuits 33 and 34 and an addition circuit 35 is provided so that the signal switching circuit may be supplied not only with the signals delayed by two line periods but also the signal delayed by a single line period and a signal which is the sum of the first two just mentioned.

For avoidance of flicker disturbances the input signal are so passed on by the signal switching circuit 36 that during a first picture field period the signal read out of the full-frame memory 31 is passed on and in a second picture field period the luminance signal is an interpolation of the luminance signals of two successive lines and the chrominance signal is obtained by repetition of the chrominance of the first picture field. Such a circuit has already been described in Published German Patent Document DE-C2 No. 26 40 759.

By means of an evaluation circuit 37 the information supplied by the circuit 11 regarding the identity of the picture fields and the switching phase of the color carrier (PAL system) are recognized for control purposes. The picture field information is supplied for controlling the signal matrix circuit 36.

At the output of the signal matrix circuit 36 there are provided digital signals respectively for conversion in the digital-to-analog converters 38 and 39 into the luminance signal Y and the chrominance signal C. The analog luminance signal is passed through a low-pass filter 40 with the cut-off frequency of 3 MHz and through a distortion corrector 41 as well as an addition circuit 42. The distortion corrector 41 serves for increasing the edge sharpness in the pictures and can for example be a switch-type of distortion corrector of the kind already well known for this purpose.

The signal provided by the digital-to-analog converter 39, the chrominance signal, proceeds through a bandpass filter 43 to a circuit 44 where, according to operating conditions in the reading-out of the digital signal from the full-frame memory 31, reverse polarity of the color difference signal U is switched back to normal and phase regulation of the chrominance signal is performed for producing a fit of the phase with that of a reference color carrier. In this processing a 90° error is avoided which would arise without phase regulation by repetition of a picture field from the full-frame memory 31. In addition residual timing errors are thereby compensated for. An improved circuity system for that purpose is disclosed in U.S. patent application Ser. No. 859,642, filed May 5, 1986, and assigned to the assignee of this application, hereby incorporated by reference.

The output signal of the addition circuit 42 is blanked in a blanking circuit 45 in accordance with the television transmission standard and is provided with luminance and color synchronizing signals in a further addition circuit 46.

Change-over switches 47 and 48 make it possible to provide the outputs 53 and 54 independently of each other with the color television signals which are read out of the full-frame memory 31 or with color television signals which are supplied without picture storage to the output circuit.

Figure 2:
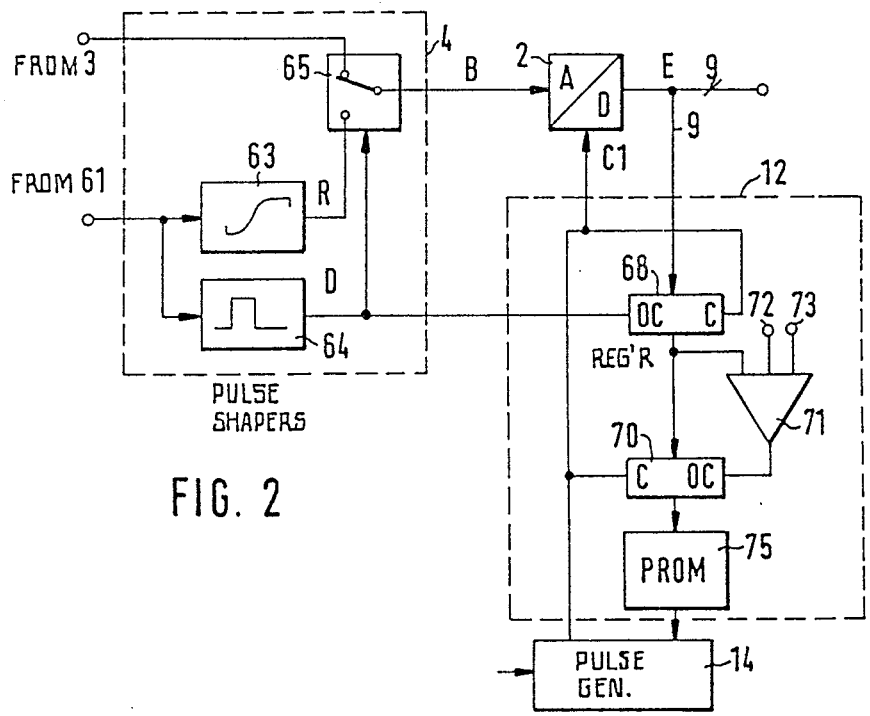

Accurate coupling of the clock signal C1 with the digital video signals is necessary for the video signal processor of this invention. A circuit for obtaining such coupling will now be explained with reference to FIGS. 2, 3 and 4. FIG. 2 shows the circuits 2, 4, 12 and 14 of FIG. 1a.

In the circuit block 4 shown in FIG. 2 by broken lines, the switch 65 puts the signal produced by the pulse shaper 63 into the analog video signal. The pulse shaper 63 can advantageously be constituted as a low-pass filter with a linear phase characteristic which shapes the signal R represented in FIGS. 3 and 4. The essential part of the signal R is a gradually rising flank or ramp which begins at the lower control threshold of the analog-to-digital converter 2 and runs symmetrically to the 50% line of the control thresholds while its rise time covers between one and two periods of the clock signal. The signal B correspondingly produced at the output of the switch 65 is shown in FIG. 3 and is supplied to the analog-to-digital converter 2.

For control of the switch 65 a horizontal synchronization pulse supplied from circuit 61 (FIG. 1b) is used to derive, in the pulse shaper 64, the rectangular pulse shown at D in FIG. 2. The pulse shaper 64 contains a monostable switching stage (multivibrator) which is of a well known type.

The analog-to-digital converter 2 is supplied with the clock signal C1. The digital color television signals having a precision or resolution of 9 bits proceed for further processing from the output of the analog-to-digital converter 2 over the circuit point 7.

The digital color television signals are likewise supplied, with a bit width of 9 bits, into a register 68. The register 68 is clocked with the clock signal C1 and, in addition, controlled by the pulse D produced by the pulse shaper 64.

FIG. 4 shows on a time scale greater than that of FIG. 3, in the line designated E, the portion of the digital color television signal corresponding to the signal R, shown as an analog signal merely to simplify its appearance. In the region of the pulse D there appear several pulses of the clock signal C1. The corresponding sample values are passed on from the register 68 and reach another register 70 and a window comparator 71, the output signal of which controls the register 70. The window comparator is a well known circuit not requiring any further description and provides a signal at its output whenever the value of the input signal supplied from the register 68 lies between two reference values supplied at inputs 72 and 73, which may for example be 10% and 90% of the overall amplitude of the signal D.

Before the beginning of the ramp the sample values are very small, so that the register 70 is not made available by the window comparator 71. The first value which is greater than 10% of the overall amplitude of the signal D is written into the register. If thereafter still another sample value lying below 90% of the signal D appears, that sample replaces the one previously written into the register 70. The sample value as described below is utilized for control of the phase position of the sampling pulses. In normal operation, that is, in the absence of the effect of particular disturbances, a phase position is provided such that the signal D is produced in the neighborhood of the point M shown in the signal E.

The shape of the ramp of the signal R is set in a programmable read-only memory (PROM) 75. From the sample value there is determined the deviation of the sampling instant at which this sample value appeared from the midpoint M of the ramp. This value is read out of the PROM 75 and utilized for control of the phase position of the clock signal C1.

In the correction of time and velocity errors for color television signals an evaluation of the color synchronization signal is performed. For this purpose it is possible to provide favorable conditions by providing for the color synchronization signal to be superimposed on a section of the inserted signal which follows the function just described and the amplitude of which preferably lies at 50% of the amplitude region of the video signal, as indicated in FIG. 3.

The pulse generators 14 and 25 (FIG. 1a) must fulfill the following requirements: Both the phase state at the beginning of a line and also the frequency should be controllable by externally supplied control signals; the stability of the frequency, similarly to that of a color carrier, must lie in the region of $10^{-6}$; the phase and the frequency must be able to follow changes of the control signals without substantial lag.

The requirements can hardly be fulfilled with conventional oscillators such as quartz-controlled and start-stop oscillators. Consequently digital pulse generators are used which are shown in FIGS. 5 and 6.

In the embodiment of FIG. 5 there is a 20-place addition circuit 101 having an output 102 and first and second inputs 103 and 104. The 20 binary places of the output 102 are connected with the inputs of a 20-place register 105, the outputs of which in turn are connected to the first input 103 of the adding circuit 101. The register 105 is controlled with the clock signal C2 supplied at 106.

With every clock pulse supplied at 106 there is produced a circulation of the digital signals in which the value supplied to the input 104 of the addition circuit 101 is added in each cycle. When the addition circuit has reached its maximum capacity it begins again at zero.

The 8 least significant places of the input 104 are connected through a register 107 with a first 8-place input 109. A second 8-place input 110 is connected through another register 111 with the 8 most significant places of the input 104. The four places of the input 104 lying between those inputs are supplied with zeros which is represented in FIG. 5 by the grounding sign. In addition the place of the input 104 having the second-most significant value can be presented with a 1 over the register 107. The clock inputs of the registers 107 and 111 are provided with the clock signal C2 through the input 106. Furthermore, the registers can alternately be blocked by a synchronizing pulse supplied to the input 112, with the synchronizing pulse being supplied to the register 107 through an inverter 113. The alternate blocking of the registers 107 and 111 by means of the synchronizing pulse supplied at 112 has the effect that on the one hand the 8 most significant places of the input 104 are briefly set at the values of the signal supplied at 110 and that, on the other hand, between the synchronizing pulses there is provided a 1 at the second highest place and the signal supplied at 109 is provided at the least significant places of the input 104, with the remaining places set to zero.

By the repeated addition of the 1 in the second highest place together with the value supplied at 109 there is produced a value rising linearly with time for the output signal of the adding circuit 101 and of the register 105. When the addition circuit 101 reaches its full capacity the content jumps back to zero and thereafter rises linearly again. The frequency is essentially determined by the 1 in the second most significant place. The steepness of the rise and thereby the frequency of the output signals of the register 105, can be controlled in extremely small steps by means of the value supplied at 109. In this connection what is meant by frequency of the output signals of course does not mean the clock frequency, but the frequency of the analog signals which are represented by the digital signals.

If now briefly, during the synchronizing pulse, the value supplied through the input 110 is put into the 8 most significant places of the input 104, the linearly rising portion of the sawtooth-shaped voltage wave is set at an initial value from which the rise is continued. Thus a setting of the phase relation between the output signals of the register 105 and the synchronizing pulse supplied at 112 is possible by means of the value of the signals supplied at 110.

The frequency of the output of the register 105 corresponds to about a quarter of the frequency of the clock signal C2 supplied at 106.

For simplification of the later-performed frequency multiplication the sawtooth function is converted into a sine function by means of a programmable read-only memory (PROM) 114. The development of the sine function from the sawtooth function is stored in the PROM, so that when the output signals of the register 105 are put into the address inputs of the PROM, signals are provided at the data outputs of the PROM that incorporate a sine function. The derivation of the sampling signals to be generated from the output signals of the register 105 does not require the same high precision which was selected for carrying out the accumulation process by means of the adding circuit 101 and the register 105. For that reason only the 10 most significant places of the output signal of the register 105 are supplied to the PROM 114. The output signals of the PROM 114, moreover, have a width of only 10 bits and are supplied through a register 118 to a digital-to-analog converter 115, the output of which is connected with a frequency multiplier 116. The clock signals provided at the output 117 of the frequency multiplier 116 can be modified with respect to their frequency in the region of the frequency of the clock signal C2 supplied at 106. A phase shift of several clock pulse periods, moreover, is possible. In the case of the circuit used as the digital pulse generator 14, the frequency can be changed in extremely small steps. Thus, for example, the change of the least significant bit at the input 109 corresponds to a change of the phase position with respect to the horizontal synchronization pulse of the magnitude of 0.48 ns per line.

The adding circuit 101, the registers 105, 107 and 111, as well as the circuit 114, can easily be constituted with ordinary digital circuit components. Because of the relatively high frequencies it is desirable to rely on TTL components of Series F (=fast) for a practical example. The registers are then constituted by Type F 374 components and, on account of the high bit width, several registers are connected in parallel. Similar conditions govern the choice of other components and the addition circuit 101 can be constituted out of five components of Type F 283. The circuit 114 can be provided with a PROM of Type TBP 24 541 and a PROM of Type TBP 28 586. Finally a suitable digital-to-analog converter is available under the type designation TDC 1016.

Although the embodiment of a frequency multiplier poses no difficulties for a person skilled in the art, it is still desirable to explain a circuit of a simple frequency doubler schematically illustrated in FIG. 6. Two of these frequency doubler circuits are connected in cascade in the circuit 116 (FIG. 5).

The sinusoidal signal provided at the output of the digital-to-analog converter 115 (FIG. 5) is supplied through the circuit point 120 to both inputs of a multiplier 121. At the output of the multiplier 121 there accordingly is found a signal which consists of a sinusoidal oscillation of double frequency and a d-c component. The d-c component could be removed, if desired, by a simple RC coupling. In the illustrated circuit, however, a bandpass filter 122, 123, 124 is contemplated which removes, in addition to the d-c component, also possibly arising harmonics produced by nonlinearities of the multiplier 121. At the output 125 there accordingly is made available a sinusoidal oscillation with doubled frequency.

Other circuits, for example PLL circuits, can also be used as frequency multipliers in the illustrated system.

FIG. 7 schematically shows the putting in and separation of 2 H and 2 V pulses as is carried out in circuits 11 and 37 of FIGS. 1a and 1b respectively. Double-throw switches 131 and 132 are interposed in two of the nine parallel data lines and are controlled by a pulse shaper 133. The pulse shaper is clocked by a horizontal synchronizing pulse H and produces a pulse 500 ns wide which is provided to the switches 131 and 132. During this time interval the 2 H and 2 V pulses supplied by the circuit 61 (FIG. 1b) are put in. During the remaining part of the line period the switches 131 and 132 are in their upper position and accordingly complete the path of the conductors for the seventh and eighth bits.

In the circuit 37 the conductors for the seventh and eighth bit are connected with inputs of a doubled D register 134 which is clocked with the pulse H. The pulses 2 H and 2 V are then available at the outputs of the D register.

The circuit 16 (FIG. 1a) for determining velocity error is illustrated in detail in FIG. 8. The circuits 2, 12, 13 and 14 as well as their cooperation have already been described in connection with FIG. 1a.

The circuit 136 to which the digital color television signals are supplied represent the selection circuit by which selected sample values are formed during the color synchronization signal.

In the circuit 136 the sample values of the digital signals during the color synchronization signals are checked as to whether they lie within a region in which the rise of the sine function is sufficiently great to obtain sufficiently accurate indication of the phase position by the particular sample value. This is the case in about half of the amplitude region of the color television signal—therefore in the case of the phase positions for which the sine curves lie between −0.5 and +0.5.

In order to convert the sample value into a phase value the output signals of the circuit 136 are supplied to a circuit 137 for computation of the arc sine. The circuit 137 consists eventually of a read-only memory (PROM) in which a corresponding function table has been written in. Since the color synchronization signal can be overlayed by random disturbances which spoil a phase measurements, the average of four measurements within a color synchronization signal is produced in a circuit 138.

Since the clock signal C1, constrained by the phase regulation provided by the circuit 12, can have a phase jump at the beginning of the line, the value of the phase control signal corresponding to this phase jump is subtracted from the output signal of the circuit 138 in a subtraction circuit 139. With the help of the D register 140, clocked by a clock signal H, and the subtraction circuit 141, values are obtained which indicate the length of a line in response to the signals designating the absolute phase position of the color synchronization signal above discussed. It is also possible to select a different sequence of subtractions according to the rules of the commutation law.

The PROM 142 serves for the comparison of the line length values with reference values for the line length which are written into the PROM 142 as phase angles of the color carrier.

There consequently is provided at the output of the circuit 142 a value of the velocity error that is still referred to the frequency of the clock signal C1. The frequency of the clock signal C1 is in turn dependent upon the frequency control signal supplied to the pulse generator 14. In order to obtain an absolute value of the velocity error the frequency control signal is accordingly added in by means of the addition circuit 143. The signal thus resulting can be supplied as frequency control signal for the next line through a D register 144 to the pulse generator 14.

Averaging of the velocity error over several lines can be provided as indicated in FIG. 8 by the register 145 and the addition circuit 146.

In magnetic tape apparatus with oblique segment scanning it is necessary under certain circumstances to provide special derivation of a correction signal for the first line of each segment. Such a circuit is shown at 147 and is described in more detail with reference to FIGS. 9 and 10. The output signals of the circuit 147 are inserted into the correction signals for the following lines by means of the switch 148 which is controlled through a control circuit 149 by a magnetic head switchover pulse K.

The diagram of FIG. 9 shows velocity errors as function of time as they can appear in the signals supplied to the video processor of FIGS. 1a and 1b. The curve shows the course of the velocity error during the scanning of four segments 1, 2, 3 and 4. At every beginning of a segment there is a jump A (or B), while the velocity error within one of the segments consisting of 52 lines varies only slightly. The segments 1 and 3 are reproduced by a first magnetic head of a pair and the segments 2 and 4 by the second magnetic head of the pair.

It has now been found that the jumps of the velocity errors in the transition from one head to the other remain substantially constant. The magnitude of the velocity error as a whole is, however, subject to statistical fluctuation, among other things.

The handling of this problem is on the basis that within a segment a velocity error is determined by measurement of the length of a line in a known way and can be used for correction in the following line. Since however there is no similar value for correction of the first line derived from a previous line, the magnitude of the jumps A or B, as the case may be, from the previous magnetic head changeover in the same sense is utilized in order to determine, with the help of the value from the last line of the earlier segment, a correction value for the first line of the after-next segment.

In many applications of the video processor of the invention the magnitudes of the jumps A and B are practically the same, so that it is sufficient to draw conclusions from one segment changeover to the next. In known magnetic tape devices with oblique segment scanning there is no signal after the last line of a segment for determining the length of that line. Accordingly, in a further development of the method of the invention, the velocity error of the next to last line is used for determining the magnitudes of the jumps A and B as well as for the velocity error of the first line of the following segment.

The method of operation of the video signal processor of the invention will now be further explained with reference to a numerical example. A correction is to be determined for the first line of the segment 4. The measured value for the 51st line of the previous segment 3 which is utilized in the 52nd line as a correction value is added to the magnitude A. The magnitude A is calculated from the difference of the values obtained for the first line of the segment 2 and the 52nd line of the segment 1, the latter being derived from the length of the 51st line of the first segment.

There is supplied to the circuit of FIG. 10, which carries out the function of the circuirs 147 and 148 of FIG. 8, the velocity errors obtained essentially by measuring the line length and constituted in the form of digital signals of 9 bit width. They are provided to the circuit of FIG. 10 through a D register 155 clocked with pulses of horizontal scanning frequency. The value obtained at the end of the 51st is available not only for the correction during the 52nd line but also for the determination of the magnitude of the jumps A and B. Consequently the H pulse at the beginning of the first line is not supplied to the clock input of the D register 155.

The digital signals representing the correction values run through an addition circuit 156, by which the values A and B are added merely in the appropriate first line. A limiter 157 is connected to the addition circuit 156 in order to assure that the maximum and minimum value provided by the 9-place binary count will be passed on if an overflow or an underrunning should result by the addition in the addition circuit 156. To the limiter 156 there is connected through a register 158 clocked by horizontal frequency pulses, the output 159 from which the correction signals can be supplied to a correction circuit of a type in itself well known.

The output signals of the limiter 157 are further supplied to another register 160 that stores the correction value for the 52nd line of every segment until the following correction value obtained by the length measurement of the first line appears. The stored signal is taken out of the register 160 in inverted form so that in the addition circuit 161 the difference is formed between the correction value of a first line of a segment and that of the last line of the previous segment. These values A and B are separately stored in the registers 162 and 163 in each case for the duration of two segments and are supplied to the addition circuit 156 in each case at the beginning of after-next segment.

The registers 162 and 163 are clocked at the horizontal scanning frequency H. Its outputs are controlled, in each case, over an OC input with corresponding signals OC1 and OC2 in such a way that no signal from the registers 162 and 163 will be supplied to the addition circuit 156 during the periods of the second through the 52nd line.

As above mentioned, in certain cases the values of the signal jumps A and B can be practically the same and in this case only one of the registers 162 and 163 are needed.

FIGS. 11 and 12 describe a preferred form of error compensator for use, for example, as the error compensator 18 of FIG. 1a. FIG. 12 is a circuit block diagram of the low-pass filter 204 of FIG. 1.

As shown in FIG. 11, color television signals reproduced from a magnetic tape are provided at an input 201 in a form already demodulated (the recorded signals are usually frequency modulated on a carrier before recording and must be demodulated at an early step of reproduction) and converted from analog form to 9-bit wide digital signals. The demodulation stage for the signals reproduced from the tape is similarly not shown in FIG. 1a, except for the demodulator 60 which relates particularly to the synchronization pulses for use in the ramp circuit 4 of FIG. 1a. The circuit of FIG. 11 is presented as it might be used in an practically any video processor. In order to recognize readily the occurrence of signal dropouts the modulated carrier frequency signal picked up from the tape is provided at the input terminal 202 of the circuit of FIG. 11 from which it goes to a dropout detector 203 of a conventional kind that does not need to be further described here. Switching signals are produced in a well known way in the dropout detector 3 whenever the amplitude of the modulated carrier frequency signal is smaller than a predetermined value.

The digital color television signals are first subjected to a signal splitting operation, for which they are first supplied to a digital low-pass filter 204 and also to a delay circuit 5 which provides a delay equal to the propagation time of the digital low-pass filter 204. A subtraction circuit 206 subtracts the output of the delay circuit 205 from the output of the low-pass filter 204. Both the digital low-pass filter 204 and the delay circuit 205 are clocked by the same clock pulses which in the case of operation in the system of FIGS. 1a and 1b would be the clock pulses C2. In any case these clock pulses have a frequency substantially three times the frequency of the color carrier.

The the circuit point 207 there are available the low-frequency components of the digital color television signals which substantially correspond to the luminance signal. Because of the absence of the original higher frequency components these signals need no more than 8-bit width, as pointed out below in connection with FIG. 2. The subtraction circuit 206 effectively removes the luminance signal components from the original color television signal so that ar the circuit point 210 and therefore at the output of the subtraction circuit 206 only the higher frequency components, which substantially correspond to the chrominance signal, are provided for further processing.

If no signal dropout is present pulses are provided at the outputs 211 and 212 of the detector circuit 203 which are supplied to the write enable inputs WE of the write-read memories (RAM) 213 and 214. The RAMs 213 and 214 are respectively controlled by address counters 215 and 216, to which the clock signals C and, at longer intervals, horizontal synchronization pulses H are supplied. The RAM 213 has a capacity of one line, whereas the RAM 214 can store the signals of two lines.

The pulses supplied to the above-mentioned WE inputs of the RAMs proceed to an input-output (I/O) memory thereof which is caused to function as an input during a part of every clock pulse period and as an output during the remainder thereof. In this operation the switches 217 and 218 are controlled through the inverter stages 219 and 220 in such a way that gates of the RAMs 213 and 214 have signals supplied to them only when these gates are operating as inputs. During the remaining portions of the clock periods the signal values written in during the first part of the clock period are read out again. In consequence, except for this very slight delay there is no modification either of the luminance signal Y or the chrominance signal Ch.

The chrominance signal Ch still needs to be inverted because of the effect of the subtraction circuit 206 with the polarities indicated in FIG. 11. For this purpose the switch 224 is put in its lower position of FIG. 11 by the detector 203 when no signal dropout is present. Both signals are then put back together in an addition circuit 221 and are then made available for further processing at the output terminal 222.

Whereas in known circuits for compensation of signal dropouts a so-called main channel is provided in which the color television signals are not split into luminance and chrominance signals, and in which when a dropout occurs there is merely a replacement by a substitute signal, in the method and apparatus illustrated by way of example in FIGS. 11 and 12, even when there is no dropout, the color television signals are split into luminance and chrominance components and recombined for further processing. No quality deterioration results from the signal splitting since the output signal of the low-pass filter 204 is simply subtracted digitally in the circuit 206 from the merely delayed original signal and then digitally added back in the circuit 221.

When a signal dropout appears the pulses which would otherwise go to the WE inputs of the RAMs 213 and 214 are blocked. No signals are then written into the RAMS 213 and 214. Instead the already stored signals are merely read out after one circulation—i.e. after one line in the case of RAM 213 and after two lines in the RAM 214—while the switches 217 and 218 remain open.

The signal paths from the input 201, through the delay circuit 205, the subtraction circuit 206, the switch 224, the inverter 225 and the addition circuit 221 are designed for a bit width of 9, whereas the low-pass filter 204, the RAMs 213 and 214 have a bit width of only 8, as already noted, which represents a substantial simplification, since many of the commercially available digital circuit components are designed for a bit width of 8. If no signal dropouts are present the signal is transmitted with a bit width of 9 since the output signal of the digital low-pass filter, as already mentioned above, is digitally merely subtracted at first and later added back and is consequently of no effect.

The RAM 214 is designed for a content of two lines in the illustrated case in order to meet the requirements of the PAL and SECAM television standards. For compensation of signal dropouts in television signals according to the NTSC standard a storage capacity of one line is sufficient.

FIG. 12 shows a circuit block diagram of the digital low-pass filter 204. The digital signals present at the input 201 are supplied successively, at a bit width of 8 bit to 8 D registers 231 to 238 by simply passing the signal through the chain of registers. These D registers are controlled by a clock signal of the sampling frequency of the digital color produced in passage through each of the D registers. It is well known in transversal filters to weight the individual delayed signals at different values and then to add them together to provide the filter output. In the illustrated low-pass filter the coefficients are distributed symmetrically with respect to a sample value that appears at an output with a mean value of delay. For this reason weighting of the samples can be performed by adding two samples together before each multiplication by a coefficient.

FIG. 12 accordingly shows the undelayed signal and the signal delayed by eight sampling periods added together in an addition circuit 241, the signals respectively delayed by one and seven sampling periods added together in an addition circuit 42, the respective signals delayed by two and six sampling periods added together in an addition circuit 243 and the signals respectively delayed by three and five sampling periods added together in an addition circuit 244. The four sums then obtained are respectively put into the D registers 245, 246, 247 and 248, from which they go respectively to the multiplier 251, 253 and 254 for multiplication by the coefficients further discussed below, to deliver the respective products to the D registers 255, 256, 257 and 258 for readouts into the addition circuits 260 and 261 as shown in the figure and delivery of subtotals to the D registers 263 and 264 for reading out into the addition circuit 262 which feeds the D register 267.

For completion of the output signal of the filter it is still necessary to add the value of the sample having a mean amount of delay—in the system of FIG. 2, the signal at the circuit point 249. Since in the above-described pair-wise addition of the other sample values uses the signal paths in which delays necessarily appear, in the arrangement of FIG. 2 the mid-delay signal is not taken from the circuit point 249, but instead is derived from the signal delayed, relative to the signal at the point 249, by three sample periods, namely the signal available at the point 250. The latter is multiplied in the multiplier 265 by a coefficient and delivered to a D register 266 from which it is read out for addition, in the addition circuit 268, to the contents of the D register 267, namely the weighted sum of the other sample values. The output of the adding circuit 268 goes to the circuit point 207 which corresponds to the point 207 in FIG. 11.

In the case of a color television signal according to the PAL standard, in which there are 625 lines per frame, the coefficients tabulated below for use in the multiplier of FIG. 2 have been found particularly favorable:

| Multiplier | Coefficient |
|---|---|
| 251 | 0.04476444 |
| 252 | −0.295265535 |
| 253 | 0.3131685 |
| 254 | 0.307442 |
| 265 | 0.629889 |

It can happen that, during or shortly after start-up of a magnetic tape machine, failure of synchronization in processing circuits can occur because synchronizing pulses from the tape appear at the wrong times when the coupling with the reference synchronizing signal has not yet been established. In the circuit of FIG. 11 a black level limiter 226 is provided in the luminance signal path which has the threshold about 10% below the sample value. So-called sync penetration is thereby prevented. This is not necessary where similar precautions have been taken elsewhere in the circuit.

It is evident that the signal dropout compensator illustrated in FIGS. 11 and 12 can be used in the place of the circuit 18 in FIG. 1a, since in FIG. 1a the signals are already digitalized before they are supplied to the dropout compensator. It is to be understood of course that the dropout detector 203 of FIG. 11 in the case of a dropout provides for replacing the dropout affected signal sample both in the case of the luminance signal and in the case of the chrominance signal in one of the known ways. As already mentioned a preferred apparatus and method for providing such replacement signals is described in the above-mentioned U.S. patent application Ser. No. 859,642, filed May 5, 1986. The replacement signals would in such case be written into the RAMs 213 and 214.

It should again be noted that not only the system of FIGS. 11 and 12 is usable in other contexts than those specifically described here, but the accurate timing and timing control systems illustrated in FIGS. 2-6 are widely usable in other contexts also.

FIG. 13 shows in more detail an arrangement already briefly described with reference to FIG. 1a, more particularly with regard to the inputs 57 and 58, the switch 59 and the demodulator 60, as well as the pulse separation circuit 61 shown there.

As shown in FIG. 13, two oppositely located magnetic heads 302 and 303 are provided on the periphery of the head wheel 301. The magnetic tape 304 is guided by the tape direction deflection elements 305 and 306 in such a way that the tap passes around a two-part stationary cylinder, not shown in the drawing, on a helical path, passing obliquely over a gap between the coaxially disposed parts of the cylinder within which the head wheel revolves, this type of structure being quite conventional and not needing further description.

The angle around which the tape surrounds the cylinder is greater than 180°, so that one of the two magnetic heads 302 and 303 already comes into contact with the tape 304 before the other head leaves contact with the tape. In known devices of this type, according to the television transmission standard in use, a picture field is distributed over five or six track segments. The head wheel 301 is driven by a motor 307, while the tape 304 is advanced by a capstan device 308 containing another motor not separately shown. Both motors are controlled by a control circuit 309 to which there are supplied, among other things, horizontal synchronization pulses H obtained from an input terminal 310. The control circuit 309 is also supplied with a so-called head wheel pulse which is produced by a stationary magnetic head 311 which responds to a small permanent magnet 312 mounted on the head wheel. This head wheel pulse provides a report to the control circuit of the actual position of the head wheel 301.

The signals generated by the magnetic heads 302 and 303 are supplied through magnetic couplings and a record/reproduction changeover switch, not shown in the drawing, respectively to amplifiers 313 and 314. The amplifiers serve to bring up to a usable amplitude the extremely small signals induced in the magnetic heads as well as to remove distorion such as results from pre-emphasis of certain frequencies performed for recording.

In the known recording and reproducing magnetic tape machines the outputs of the amplifiers 313 and 314 are each connected to an input of a change-over switch 315 to the output of which a demodulator 316 is connected. The demodulated television signals are then supplied to a timing error compensator, as already described at length above and here represented merely by the circuit block 317, at the output 318 of which television signals are available that are free from timing errors.

In order to prevent the switch-over from one head to another from producing visible disturbance of the reproduced picture, the actuation of the change-over switch 315 takes place during the horizontal scanning blanking interval. In the illustrated case the switch-over during the horizontal blanking interval is obtained by having the control circuit 309 provide a signal K which is maintained in one logical state while the change-over switch 315 is to be in its upper position and is maintained in the other logical state for the period during which the change-over switch is to be in its lower position. The flanks of the signal K lie within the television line which precedes the horizontal blanking interval during which the switch 315 is to be actuated. The flanks of the signal K are passed on from the clock-state-controlled D flipflop 319, however, only when the clock input of the flipflop is supplied with a horizontal synchronization pulse H.

In accordance with the invention the outputs of the amplifiers 313 and 314 are connected with the inputs of a second change-over switch 320 at the output of which a second demodulator 321 is connected. The demodulator 321 can be simpler in construction than the demodulator 316, since it is not subjected to the strict performance requirements of a component lying in the main channel of a television system. A second clock-pulse-state controlled D flipflop 322 is provided for control of the second change-over switch 320. The data input of the second flipflop 322 is likewise supplied with the signal K and its clock input is connected, for example at 323, to a source of horizontal synchronization pulses delayed by half a line period.

In the illustrated embodiment, however, the flanks of the signal K are offset, by suitable design of the control circuit 309, into the first half of the last line picked up one of the magnetic heads 302 and 303 from the magnetic tape 304. Hence just before that H pulse which appears at the beginning of the first line picked up by the next magnetic head, thus about in the middle of the previous line, the change-over switch 320 is switched over. The recording-carrier-frequency signals corresponding to the horizontal synchronization pulse accordingly reach the demodulator 321 quite undisturbed. The output of the demodulated signals can then be supplied to a circuit 324 for separation of the horizontal synchronization pulse and for control thereby of the timing error compensating circuit 317.

Although the invention has been described in its various aspects with respect to a particular illustrative example, it will be recognized that variations and modifications are possible within the inventive concept.

I claim:

1. Digital pulse generator of phase and frequency periodically controllable precisely without substantial lag and having high frequency stability, for use with a video signal processor incorporating a reference clock pulse generator of highly precise frequency, comprising:

a digital addition circuit (101) having an output (102) and having first and second inputs (103, 104);
   a register (105) having a data input connected to said output (102) and an output connected to said first input (103) of said digital addition circuit (101) and having a clock pulse input connected to said reference clock pulse generator, and
   means (111) connected to said second input (104) of said digital addition circuit (101) for briefly presenting a first value in response to the arrival, from said video signal processor, of a synchronizing pulse or horizontal scanning frequency and for presenting a second value in said second input (104) during the remainder of a television line period following the presentation of said first value to said second input of said digital adding circuit, whereby a sawtooth wave of parallel-bit digital signals is made available to means at said register output for deriving a pulse sequence therefrom in said pulse generator, said sawtooth wave having a frequency which is submultiple of the frequency of the output of said reference clock pulse generator.

2. Pulse generator of controlled phase and frequency according to claim 1, wherein said means for presenting values to said addition circuit (101) includes second and third registers (107, 111) connected ahead of said second input (104) whereby, in response to said pulse of horizontal scanning frequency, several places of said second input (104) of said digital addition circuit (101) which are of higher binary digit significance are connected with an input (110) for said first value when said first value is presented and several places of said second input (104) of lower binary digit significance are connected with an input (109) for said second value during presentation of said second value.

3. Pulse generator according to claim 2, wherein said digital addition circuit (101) and at least one of said registers (105) has the capacity of 20 binary digit places.

4. Pulse generator of controlled phase and frequency according to claim 1, wherein said means for deriving comprises means (114, 118) for converting the digital sawtooth wave output signal of said register (105) into a digital sinusoidal wave of a fraction of the frequency of said reference clock signal.

5. Pulse generator according to claim 4, further comprising a digital-to-analog converter (115) for receiving said digital sinusoidal wave and supplying a sinusoidal oscillation at an output of said digital-to-analog converter (115) and a frequency multiplier connected to said output of said digital-to-analog converter for producing an output of the frequency of said reference clock pulse generator.

6. Pulse generator according to claim 5, wherein said frequency multiplier (116) is composed of a plurality of frequency doublers each containing an analog multiplier (121) and a filter (122, 123, 124) tuned to the output frequency.

7. Digital pulse generator of phase and frequency periodically controllable precisely without substantial lag and having high frequency stability, for use with a video signal processor incorporating a reference clock pulse generator of highly precise frequency, in an apparatus for responding to blocks of tape-recorded digital data having a synchronizing signal at the beginning of each block and a data free interval between blocks comprising:

a digital addition circuit (101) having an output (102) and having first and second inputs (103, 104);
   a register (105) having a data input connected to said output (102) and an output connected to said first input (103) of said digital addition circuit (101) and having a clock pulse input connected to said reference clock pulse generator, and
   means (111) connected to said second input (104) of said digital addition circuit (101) for briefly presenting a first value in response to the arrival of a synchronizing pulse, from said digital data reproducing apparatus and for presenting a second value in said second input (104) during the remainder of a data block interval following the presentation of said first value to said second input of said digital adding circuit, whereby a sawtooth wave of parallel-bit digital signals is made available to means at said register output for deriving a pulse sequence therefrom in said pulse generator, said sawtooth wave having a frequency which is submultiple of the frequency of the output of said reference clock pulse generator.

8. Pulse generator of controlled phase and frequency according to claim 7, wherein said means for presenting values to said addition circuit (104) includes second and third registers (107, 111) connected ahead of said second input (104) whereby, in response to said synchronizing pulse, several places of said second input (104) of said digital addition circuit (101) which are of higher binary digit significance are connected with an input (110) for said first value when said first value is presented and several places of said second input (104) of lower binary digit significance are connected with an input (109) for said second value during presentation of said second value.

9. Pulse generator according to claim 8, wherein said digital addition circuit (101) and at least one of said registers (105) has the capacity of 20 binary digit places.

10. Pulse generator of controlled phase and frequency according to claim 7, wherein said deriving means comprises means (114, 118) for converting the digital sawtooth wave output signal of said register (105) into a digital sinusoidal wave of a fraction of the frequency of said reference clock signal.

11. Pulse generator according to claim 1, further comprising a digital-to-analog converter (115) for receiving said digital sinusoidal wave supplying a sinusoidal oscillation at an output of said digital-to-analog converter (115) and a frequency multiplier connected to said output of said digital-to-analog converter for producing an output of the frequency of said reference clock pulse generator.

12. Pulse generator according to claim 11, wherein said frequency multiplier (116) is composed of a plurality of frequency doublers each containing an analog multiplier (121) and a filter (122, 123, 124) tuned to the output frequency.

* * * * *